United States Patent
Van Gorkom

(10) Patent No.: US 7,156,529 B2
(45) Date of Patent: Jan. 2, 2007

(54) CONTRAST ENHANCEMENT FILTER AND DISPLAY PROVIDED WITH SUCH FILTER

(75) Inventor: Ramon Pascal Van Gorkom, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 64 days.

(21) Appl. No.: 10/494,824

(22) PCT Filed: Oct. 22, 2002

(86) PCT No.: PCT/IB02/04410

§ 371 (c)(1),
(2), (4) Date: May 7, 2004

(87) PCT Pub. No.: WO03/042726

PCT Pub. Date: May 22, 2003

(65) Prior Publication Data

US 2004/0257658 A1    Dec. 23, 2004

(30) Foreign Application Priority Data

Nov. 12, 2001    (EP) .................................. 01204301

(51) Int. Cl.
*G02B 27/00* (2006.01)
*G02B 27/14* (2006.01)
*G02F 1/1335* (2006.01)
*H01J 9/227* (2006.01)

(52) U.S. Cl. ................ 359/614; 359/583; 359/629
(58) Field of Classification Search ........ 359/443–461, 359/601–614, 515–553, 583, 629–639
See application file for complete search history.

(56) References Cited

U.S. PATENT DOCUMENTS

| 2,773,411 | A | * | 12/1956 | Schwede | 359/613 |
|---|---|---|---|---|---|
| 4,070,100 | A | * | 1/1978 | Akiyoshi | 359/613 |
| 4,165,920 | A | * | 8/1979 | Brown | 359/613 |
| 5,911,616 | A | * | 6/1999 | Levine et al. | 445/52 |
| 6,040,941 | A | * | 3/2000 | Miwa et al. | 359/443 |
| 6,398,370 | B1 | * | 6/2002 | Chiu et al. | 359/613 |
| 6,597,417 | B1 | * | 7/2003 | Veligdan | 349/95 |

FOREIGN PATENT DOCUMENTS

EP    304 517 A1    3/1989

* cited by examiner

*Primary Examiner*—Thong Q Nguyen

(57) ABSTRACT

A contrast enhancement filter for a display device includes a plurality of connected sloping surfaces acting as a plurality of beam splitters, and a plurality of light absorbers, each arranged between adjacent beam splitters, so that light incident into an area on the side of the absorber is partly reflected by the beam splitters into adjacent absorbers. Light entering from the opposite side is partially reflected towards the absorbing walls located on either side of the pointed shape. The remaining light is transmitted through the filter.

20 Claims, 3 Drawing Sheets

CONTRAST ENHANCEMENT FILTER AND DISPLAY PROVIDED WITH SUCH FILTER

The present invention relates to a contrast enhancement filter for a display device comprising an element with a plurality of connected sloping surfaces, acting as a plurality of beam splitters.

The invention also relates to a display device equipped with such a filter.

In a conventional contrast enhancement filter, light traveling through the filter gets absorbed to an essentially equal extent in both directions. The contrast enhancement is based on the number of passages of the light through the filter. Ambient light entering the filter from the outside passes the filter twice, while the light from the display only passes the filter once.

A problem with conventional contrast enhancement filters is that the enhancement of the contrast is relatively limited.

Therefore, an object of the present invention is to provide a contrast enhancement filter in which the enhancement of the contrast is improved.

This and other objects are achieved with a filter of the kind given by way of introduction, further comprising a plurality of light absorbers, each arranged in an area between adjacent ones of the plurality of beam splitters and extending from a first side of the element, being the side on which ambient light impinges, towards at least one of said adjacent beam splitters, for absorbing light incident into said area and reflected towards the light absorber by one of said adjacent beam splitters.

In the contrast enhancement filter according to the invention, a substantial fraction of the ambient light is absorbed by the filter, thereby increasing the enhancement of the contrast.

To explain this, the element can be regarded as a beam splitter system that is divided into sections, each consisting of two adjacent beam splitters. Said adjacent beam splitters form a pointed surface, pointing towards the first side.

Incident light entering the filter from the first side hits the pointed surface, and is partially reflected sideways, towards the light absorbers. Thus, a substantial fraction of the ambient light is absorbed. Moreover, a fraction of the incident light hits the light absorber directly, i.e. the absorber works as a kind of black matrix. In some applications, it can be advantageous to make the absorber a little wider than necessary, to enhance this effect.

For light emitted by the display, entering the filter from a second side opposing the first side, the pointed surface acts as a funnel. The emitted light is partly reflected, first across the pointed shape and then back towards the second side. At each reflection, the light is partly transmitted, the first time to continue towards the first side of the filter, and the second time towards the absorbing walls.

As a result of this process, a fraction of the emitted light is reflected back towards the source. This is particularly advantageous in an emissive display implementation, where the inventive filter is arranged outside the emissive layer, with the second side facing the emissive layer. The light reflected back to the source is re-reflected into the filter by the emissive layer, and therefore further contributes to the light emitted from the screen. Thus, the fraction of emitted light that passes the filter is increased.

The angle between the beam splitters and the outer surface of the filter is preferably essentially 45 degrees. At this angle, the contrast enhancement of the filter is particlarly good.

According to one embodiment, the element comprises a substrate formed with a plurality of grooves, and the absorbers are arranged in these grooves. The grooved substrate surface then forms the beam splitters, and the pointed shape results from a ridge between two grooves. The absorbers act as dividers between the ridges.

According to another embodiment, the element comprises a substrate formed with a plurality of ridges, each having a crest and a base, and the absorbers are formed by a plurality of channels formed along the length of said ridges, each channel extending from the crest of a ridge a distance into said first substrate, said channels being filled with a light absorbing material. In this case, the pointed shape is formed by a valley or groove between two ridges.

According to a preferred embodiment, the filter comprises a first substrate, formed with a plurality of ridges, each having a crest and a base, and a second substrate, formed with a plurality of grooves, said first and second substrate being fitted together, so that said ridges are received by said grooves. The two substrates have surfaces with essentially inverse topology. When they are fitted together, the system of beam splitters is created by the surfaces of the grooves and ridges that make contact in the interface between the substrates. The pointed shape is now formed by the bordering surfaces between the substrates, and results from the protrusion between two grooves in the second substrate protruding into a valley between two ridges in the first substrate.

By employing two substrates of a solid, transparent material such as glass, the beam splitters' quality is enhanced.

Again, the absorbers can be formed by a plurality of channels formed along the length of said ridges, each channel extending from the crest of a ridge a distance into said first substrate, said channels being filled with a light absorbing material.

According to a further embodiment, the first substrate is formed with parallel Λ-shaped ridges, while the second substrate is formed with parallel V-shaped grooves. This creates a border surface with regular, zig-zag shaped cross section in one direction.

According to yet another embodiment, the second substrate is formed with several sets of parallel V-shaped grooves, leaving protruding pyramids between said grooves. Two orthogonal sets of grooves form square based pyramids, while three sets of grooves forms three sided pyramid. In this latter case, preferably all three sides are perpendicular to each other, i.e. corners of a cube, forming so called retro reflectors. The first substrate can in both these cases be formed with ridges forming a grid with hollows, shaped to fit in between said pyramids.

According to yet another embodiment, the second substrate is formed with protruding conical shapes. The first substrate can then be formed with hollows adapted to receive said conical shapes.

The channels can preferably extend into the first substrate at least to level with the base of the ridges. The channels thus extend along the entire depth of the border surface. At least one of said substrates is preferably coated with a refractive or reflective coating. Such coating can influence the reflection and refraction of the border surface, and thus define the properties of the formed beam splitters.

These and other aspects of the invention will be apparent from the preferred embodiments more clearly described with reference to the appended drawings.

Figure 1:
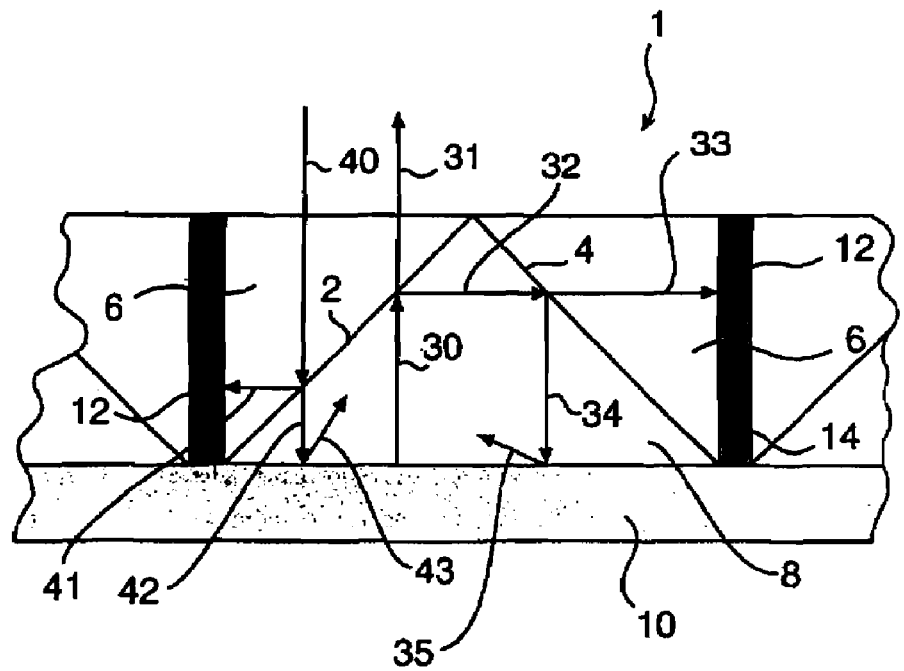
FIG. 1 is a schematic sectional view showing the principles of a filter according to the invention.

FIG. 1 shows schematically a part of a filter 1 according to an embodiment of the invention, placed on top of a phosphor layer 10 a backing, forming part of a display unit, e.g. a CRT. The following description will focus on this application of a contrast enhancement filter, although this should not be considered to be a limitation of the invention. The inventive contrast enhancement filter can be applied in most displays such as home television and computer monitors. More specifically, it can, in principle, be used in CRTs, plasma displays, "foil" displays, LED displays, etc. Basically it can be used in any display where the light generating medium can be backed by a reflective surface, or is reflective in itself. It can even be used in back-lit LCD displays, although not a lot is to be gained, because an LCD display already absorbs most of the ambient light falling on the display.

A different application of the filter according to the invention is a one-way mirror, where the inventive filter can ensure that light from one side is reflected more, while the light from the other side is absorbed more. Thus if two equally lit rooms are separated by such a mirror then it is easier to see through the mirror from one side.

Returning to FIG. 1, a first light beam 30 is emitted from the phosphor layer 10, while a second light beam 40 represents ambient light incident on the filter 1. These light beams 30, 40 are reflected by two beam splitters 2, 4 formed by two substrates 6, 8 comprising the filter 1. On each side of the beam splitters 2, 4 are channels 12, 13 formed in the upper substrate 6 and filled with a light absorbing material 14.

Figure 2:
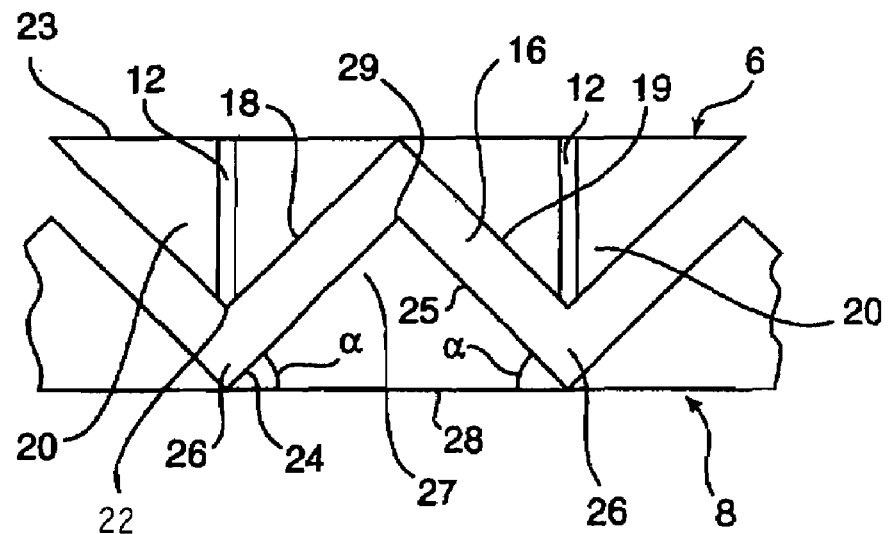
FIG. 2 is a schematic sectional, exploded view showing the principles of the invention.

As can be seen in FIG. 2, the first, upper substrate 6 features a triangular valley, or hollow 16, formed by the opposing slopes 18, 19 of two adjacent ridges 20. The hollow is surrounded by the two channels 12, which extend from the crests 22 to the bases 23 of the ridges 20.

In a similar way, the second, lower substrate 8 features a triangular protrusion 27, formed by the opposing slopes 24, 25 of two adjacent groves 26. The triangular protrusion 27 fits into the hollow 16, thereby forming the pair of beam splitters 2, 4 along the bordering surface of the two substrates 6, 8 when they are fitted together.

In the illustrated example, each side 24, 25 of the protrusion 27 forms a 45 degree angle ($\alpha$) with the outer surface 28 of the substrate 8, resulting in a triangle 27 with an essentially right angle corner 29. The ridges 20 forming the hollow 16 are formed in a corresponding way. It is clear that other shapes of the protrusion 27 and hollow 16, such as shapes with different angles, can be envisaged.

Again returning to FIG. 1, the paths 30, 31, 32, 33, 34, 35, and 40, 41, 42, 43, of the light beams 30, 40 have been marked. The difference in absorption of each beam. It is here assumed that the transmission coefficient of the beam splitter is x, and the reflective coefficient of the phosphor is y.

Beginning with the beam 30 emitted from the phosphor, the beam hits one of the beam splitters 2, 4 and is divided into two beams 31, 32. A first beam 31, representing a fraction x of the originating light intensity, is transmitted through the filter, while a second beam 32, representing a fraction 1−x, is reflected towards the second beam splitter 4, 2. A second split takes place, through which a beam 33, representing a fraction (1−x)x, continues towards the channel 13 and is absorbed, while another beam 34, representing a fraction $(1-x)^2$, is reflected back towards the phosphor 10. Finally, this beam 34 is partially reflected, resulting in a beam 35 with intensity $(1-x)^2 y$. The remaining light is absorbed.

Now turning to the beam 40 incident form outside the filter, this beam hits one of the beam splitters 2, 4 and is divided into two beams 41, 42. A first beam 41, representing a fraction 1−x of the originating light intensity, is reflective towards a channel 12 and is absorbed. The second beam 42, representing a fraction x, resulting in a beam with intensity xy. The remaining light is absorbed.

Using the coefficients x and y defined above, we have the following:

The transmission of light leaving the phosphor 10 is: $x/[1-(1-x)^2 y]$.

The absorption of light leaving the phosphor is:

$$[(1-x)x+(1-y)(1-x)^2]/[1-(1-x)^2 y].$$

The transmission of light entering the display is: xy.

The absorption of light entering the display is:

$$(1-x)+x(1-y)=1-xy.$$

Thus the ratio of transmissions for the light entering from the outside and the light from the phosphor equals.

$$T=\{x/[1-(1-x)^2 y]\}/(xy)=1/\{y[1-(1-x)^2 y]\}.$$

For a normal contrast enhancement filter, the ratio of transmission for the light entering from the outside and the light from the phosphor is (under the same assumptions)

$$Tn=x/(xy)=1/y$$

Some numbers for y=0.88 (Tn=1.14):

| x | T(x) | T(x)/Tn(x) |
|---|---|---|
| 0.01 | 8.26 | 7.27 |
| 0.2 | 2.60 | 2.29 |
| 0.3 | 2.00 | 1.76 |
| 0.5 | 1.46 | 1.28 |

Thus, for a 50/50 beam splitter and y=0.88, the brightness of the display is 28% better than a normal "50%" contrast enhancement filter which has the same contrast enhancement. A 30/70 beam splitter yields a 76% better brightness than a normal "30%" contrast enhancement filter.

This simple calculation is only valid for light perpendicular to the surface. For a real display, different angles have to be taken into account.

Note that if the beam splitter efficiency (reflection coefficient) is dependent on the angle of incident of the light, there will be a non-uniform light emission from the filter. However, the effect of this non uniform light emission is not very noticeable, and can be handled by the skilled artisan, for example by making the outer surface of the top substrate non-flat.

Figure 3:
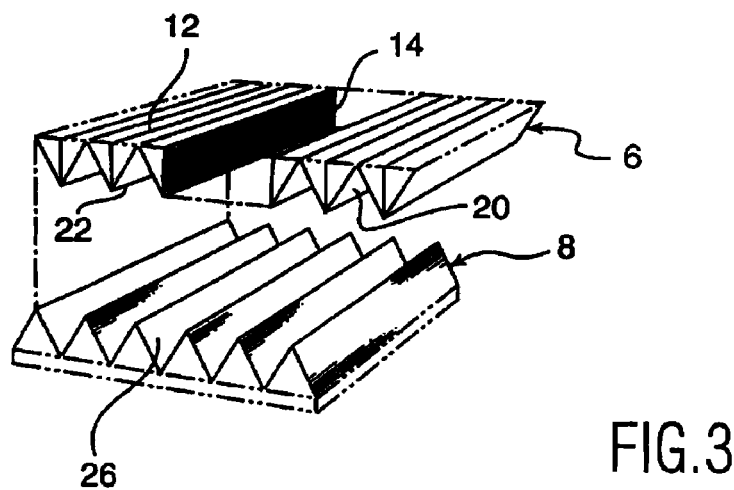
FIG. 3 is a perspective exploded view of the substrates of a filter according to a first embodiment of the invention.
Figure 4:
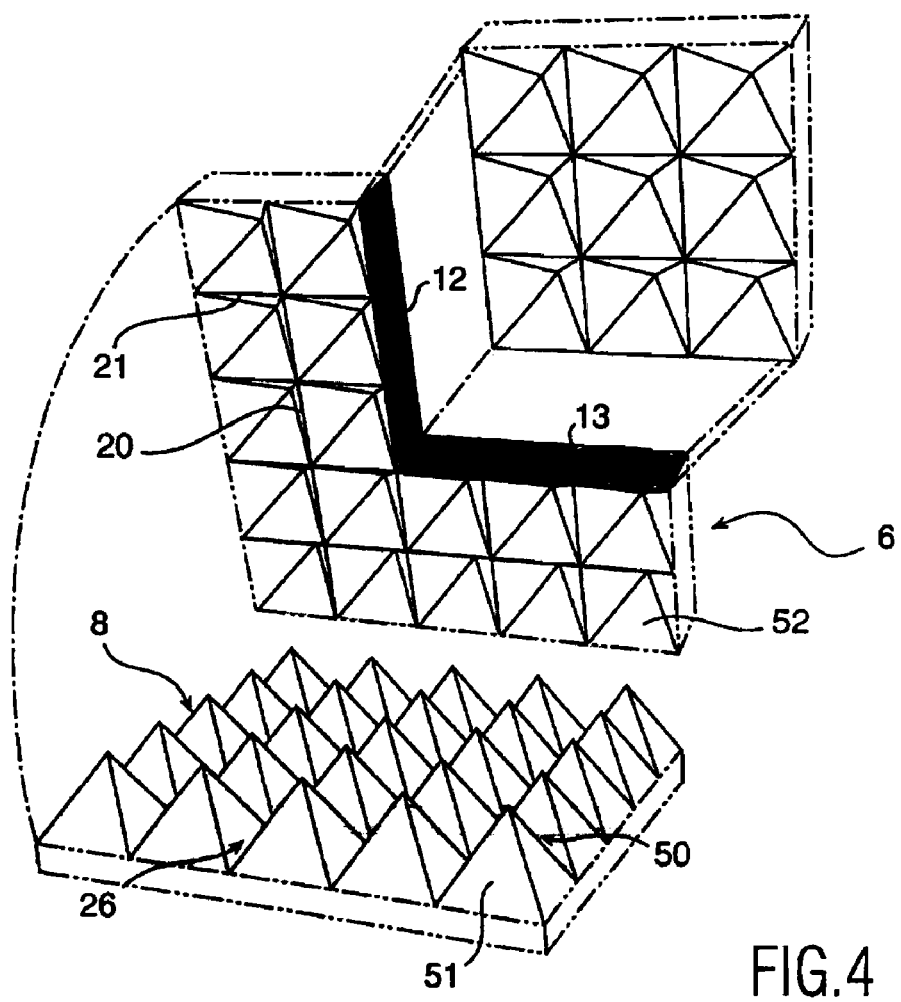
FIG. 4 is a perspective exploded view of the substrates of a filter according to a second embodiment of the invention.

With reference to FIGS. 3 and 4, the following describes examples of how a filter with the above properties can be realized.

In FIG. 3, a "V"-groove like structure is etched into a glass plate 6, for pedagogical reasons below referred to as a "Λ"-ridge structure, referring to the parallel ridges 20 formed between the grooves. Channels 12 are etched along the crests 22 of the ridges, and filled with a black absorbing material 14, such as carbon, black ink or black polymers.

A similar "V"-groove structure is etched into another glass plate 8, which then can be coated with a low refractive index coating, or a reflective coating like $TiO_2$, Al or Ag. The coating enhances the beam splitting effect, and can be optimized in accordance with the application by the skilled artisan.

The plate 6 is arranged on top of the plate 8. The two grooved surfaces are formed to fit essentially into each other, with the ridges 20 of the top plate 6 fitting in the grooves 26 of the bottom plate 8, and thereby being surrounded by the absorbing channels. The border line between the ridges and grooves create the beam splitters illustrated in FIG. 1.

With reference to FIG. 4, the above described "Λ"-ridge and "V"-grooves structure can be replaced by pyramids 51 together with "anti-pyramids" 52. More specifically, the bottom glass plate 8 is formed with pyramids 51, practically realized by etching two orthogonal sets of parallel grooves 26, 50, leaving the pyramids. The top plate is then formed with hollows 52 matching these pyramids 51, or, in other words, with ridges 20, 21 in a checked pattern, forming the hollows in between. Just as in the first embodiment, channels 12, 13 are formed running along the crests of the ridges, in this case forming a grid of channels.

By letting each pyramid/hollow represent one pixel, this second embodiment has the advantage that light does not "leak" from one pixel to the next pixel.

Figure 5:
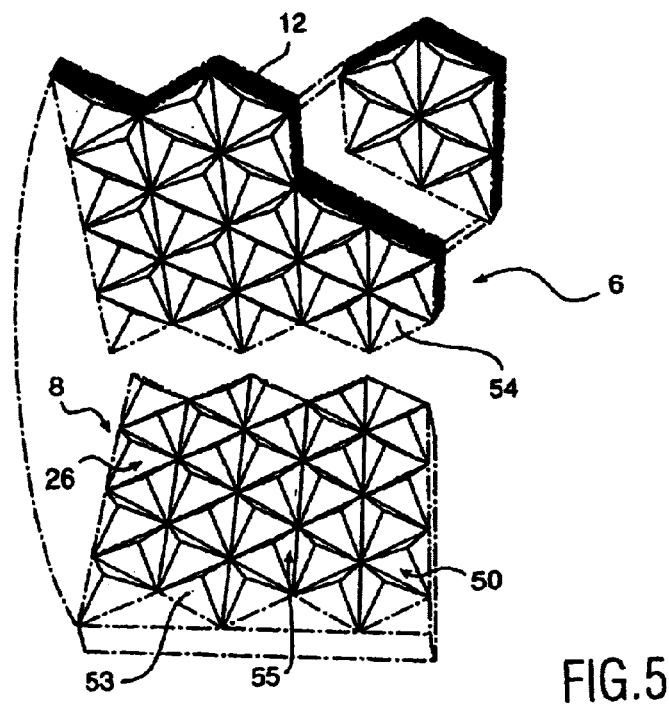
FIG. 5 is a perspective exploded view of the substrates of a filter according to a third embodiment of the invention.

As shown in FIG. 5, by forming three sets of parallel grooves 26, 50, 55 in the bottom substrate 8, the pyramids 53 will be three sided, so called retro reflectors. The hollows 54 in the top substrate 6 are adapted to receive these pyramids 53. In this case, the channels 12 would be arranged in a triangular fashion, surrounding each pyramid. Although square pyramids 51 as shown in FIG. 4 may be preferred for square pixels, the retro reflectors have the advantage of being less affected by varying distance to the light source.

Figure 6:
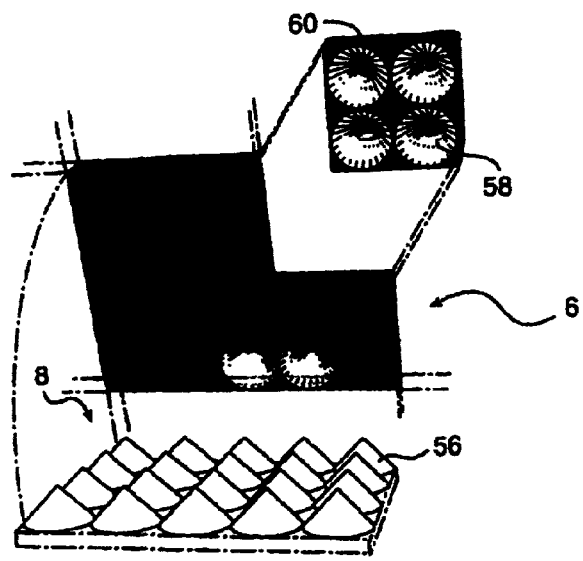
FIG. 6 is a perspective exploded view of the substrates of a filter according to a fourth embodiment of the invention.

Another example would be to have conical shapes 56 formed on the bottom substrate 8, as shown in FIG. 6. The top substrate 6 has corresponding hollows 58, adapted to receive the cones 56. In this case, the channels are formed as cylinders 60, surrounding each of the conical hollows 58. Also, the intermediate areas between the cylinders 60 are, filled with absorbing material. This reduces the emission of the filter, but for example with a so called delta-nabla layout, i.e. hexagonal sub-pixel layout, this might still be a useful solution.

In the description above, the substrates 6, 8 have been formed separately, and then assembled. Another, sometimes preferred, way to manufacture the two substrates, is to etch the desired surface pattern into a substrate 6 or 8, and then fill this pattern with a liquid material, again forming a flat surface, and then let it harden. The channels 12, 13 can be etched into the thus formed element. Other ways of manufacturing are also possible.

The beam splitter can be (partly) polarizing, because ambient light, the light transmitted from the phosphor, and the light scattering diffusively from the phosphor are all unpolarized. Thus, in effect, it does not matter if the light that is transmitter or reflected from the beam splitter is polarized or not.

It should be noted that the above described currently preferred embodiments may be modified by the skilled artisan without departing from the scope defined by the appended claims. For example, the groves and ridges can be shaped differently, as long as the function of the absorbing channels is maintained. The filter need not be arranged on top of a phosphor layer, but rather can be arranged in any application where absorption of light should be dependent upon the direction of the light.

Naturally, other optical elements may be included in the filter for improving the performance. For example, additional reflectors can be included without disrupting the function of the beam splitters and absorbers disclosed above.

The invention claimed is:

1. A contrast enhancement filter, comprising
an element with a plurality of connected sloping surfaces acting as a plurality of beam splitters, and
a plurality of light absorbers, each arranged in an area between adjacent ones of the plurality of beam splitters and extending between a first side of the element on which ambient light impinges and an opposing side, for absorbing light incident into the area and light reflected towards the light absorber by one or more of the adjacent beam splitters.

2. The contrast enhancement filter of claim 1, wherein the beam splitters each form an angle of 45 degrees with an outer surface of the filter.

3. The contrast enhancement filter of claim 1, wherein the element includes a first substrate formed with a plurality of grooves, and a second substrate opposite the first substrate, and
the absorbers are arranged in the second substrate so as to lie in the grooves of the first substrate.

4. The contrast enhancement filter of claim 3, wherein at least one of the first and second substrates includes a refractive coating.

5. The contrast enhancement filter of claim 3, wherein at least one of the first and second substrates includes a reflective coating.

6. A contrast enhancement filter according to claim 1, wherein
the element includes a substrate that includes a plurality of ridges, each having a crest and a base, and wherein
the absorbers are formed by a plurality of channels formed along the length of the ridges, each channel extending from the crest of a ridge a distance into the substrate,
the channels being filled with a light absorbing material.

7. The contrast enhancement filter of claim 6, wherein the channels extend into the substrate at least to level with the base of the ridges.

8. A display device that includes the contrast enhancement filter of claim 1.

9. A contrast enhancement filter, comprising
an element with a plurality of connected sloping surfaces acting as plurality of beam splitters, and
a plurality of light absorbers, each arranged in an area between adjacent ones of the plurality of beam splitters and extending between a first side of the element on which ambient light impinges and an opposing side, for absorbing light incident into the area and reflected towards the light absorber by one of the adjacent beam splitters, wherein
the element includes a first substrate, formed with a plurality of ridges, each having a crest and a base, and
a second substrate, formed with a plurality of grooves, the first and second substrates being fitted together, so that the ridges are received by the grooves.

10. The contrast enhancement filter of claim 9, wherein
the absorbers are formed by a plurality of channels formed in the first substrate along the length of the ridges,
each channel extending from the crest of a ridge a distance into the first substrate,
the channels being filled with a light absorbing material.

11. The contrast enhancement filter of claim 10, wherein
the second substrate is formed with protruding conical shapes.

12. The contrast enhancement filter of claim 11, wherein
the first substrate is formed with hollows adapted to receive the conical shapes.

13. The contrast enhancement filter of claim 9, wherein
the first substrate is formed with parallel Λ-shaped ridges.

14. The contrast enhancement filter of claim 9, wherein
the second substrate is formed with parallel V-shaped grooves.

15. The contrast enhancement filter of claim 14, wherein
the second substrate is formed with two orthogonal sets of parallel V-shaped grooves, leaving protruding pyramids between the grooves.

16. The contrast enhancement filter of claim 15, wherein
the ridges form a grid, with hollows adapted to receive the pyramids.

17. The contrast enhancement filter of claim 14, wherein
the second substrate is formed with three sets of parallel V-shaped grooves, leaving protruding pyramids between the grooves.

18. A contrast enhancement filter, comprising
an element with a plurality of connected sloping surfaces acting as a plurality of sets of beam splitters having multiple slopes, and
a plurality of light absorbers, each arranged between adjacent sets of beam splitters and arranged substantially perpendicular to a side of the element on which ambient light impinges so as to absorb the ambient light reflected towards the light absorber by one or more splitters of the adjacent sets of beam splitters.

19. The contrast enhancement filter of claim 18, wherein
the element is formed with two or more sets of parallel V-shaped grooves, such that each set of beam-splitters is formed as a protruding pyramid between the grooves.

20. The contrast enhancement filter of claim 18, wherein
the beam splitters each form an angle of 45 degrees with an outer surface of the filter.

* * * * *